(12) United States Patent
Kennedy et al.

(10) Patent No.: US 8,860,415 B2
(45) Date of Patent: Oct. 14, 2014

(54) METHOD AND APPARATUS FOR MEASURING BOREHOLE MUD RESISTIVITY

(75) Inventors: Scott Kennedy, Phoenix, AZ (US); Timothy Johnson, Calgary (CA); Douglas MacLean, Ardrossan (CA)

(73) Assignee: Sondex Wireline Limited, Yately, Hampshire (GB)

( * ) Notice: Subject to any disclaimer, the term of this patent is extended or adjusted under 35 U.S.C. 154(b) by 417 days.

(21) Appl. No.: 13/114,183

(22) Filed: May 24, 2011

(65) Prior Publication Data

US 2012/0299596 A1 Nov. 29, 2012

(51) Int. Cl.
*G01V 3/18* (2006.01)
*G01R 27/22* (2006.01)

(52) U.S. Cl.
USPC .......................................... 324/324; 324/351

(58) Field of Classification Search
USPC ................................. 324/324, 251
See application file for complete search history.

(56) References Cited

U.S. PATENT DOCUMENTS

| 3,701,006 | A | 10/1972 | Volkel et al. |
| 3,993,945 | A | 11/1976 | Warmoth et al. |
| 4,072,892 | A | 2/1978 | Lind |
| 6,801,039 | B2 | 10/2004 | Fabris et al. |

*Primary Examiner* — Reena Aurora
(74) *Attorney, Agent, or Firm* — Crowe & Dunlevy (57) ABSTRACT

Apparatuses, methods for manufacturing an apparatus and methods for measuring a fluid resistivity are provided. An apparatus for measuring a fluid resistivity includes a fluid column defining structure, two current injecting electrodes, voltage measurement electrodes, and two additional electrodes. The fluid column defining structure is configured to allow a fluid, whose resistivity is to be measured, to fill a fluid column inside the fluid column defining structure. The two current injecting electrodes are configured to inject a known current into the fluid column. The voltage measurement electrodes are configured to measure a voltage across a measurement column included in the fluid column. The two additional electrodes disposed inside the fluid column defining structure, outside of the positions of the two current injecting electrodes in the longitudinal direction are electrically connected to each other.

16 Claims, 4 Drawing Sheets

METHOD AND APPARATUS FOR MEASURING BOREHOLE MUD RESISTIVITY

BACKGROUND

1. Technical Field

Embodiments of the subject matter disclosed herein generally relate to methods and systems for measuring an electrical resistivity of a fluid, such as, the borehole mud.

2. Discussion of the Background

During the past years, with the increase in price of fossil fuels, the interest in developing new production fields has dramatically increased. On a drilling rig, mud is pumped from mud pits through a drill string from where it sprays out of nozzles on a drill bit, cleaning and cooling the drill bit in the process. The mud carrying crushed or cut rock is brought back up to the surface through an annular space between the drill string and sides of the borehole being drilled or a casing of the borehole. At the surface, the mud is filtered and returned to the mud pits.

In order to measure electrical characteristics of geological formations drilled through, accurate knowledge of the resistivity of the fluid in the borehole (i.e., the mud) is desired for removing its effects from galvanic, inductive or other measurement techniques.

Conventionally, the mud resistivity is measured using a tool placed in a drill string (i.e., a segmented pipe built as the borehole is drilled). Instantaneous values of mud resistivity are acquired when the mud, passes through an open-end measurement tube of the tool. The measurement of the mud resistivity using the conventional tool is performed using a low frequency alternating current and four electrodes: two outer current electrodes and two central voltage electrodes. According to Ohm's law, a ratio of a voltage measured between the two central voltage electrodes and a current passing therethrough yields a resistance R, which is attributed to a fluid passing through the measurement tube between the central voltage electrodes. The mud resistivity is calculated using the resistance R and known geometrical characteristics of the tool, such as, a distance between the central voltage electrodes and an area of the measurement tube through which fluid passes and which is perpendicular to a current direction.

One problem with the conventional measurement described above is that the resistance R is obtained using an inaccurate value of the current. In fact, the current injected by the outer current electrodes is divided into a part flowing between the current electrodes inside the measurement tube, and a part flowing between the current electrodes through mud in the borehole outside the measurement tube. Thus, some of the injected current is diverted away from the measurement electrodes introducing uncertainty and variability in the measurement.

Some solutions to this problem have been attempted with mixed results, the attempted solutions being affected by additional errors. In one attempted solution, at least one 'bucking' electrode at zero (ground) potential has been placed in addition to the four electrodes, outside the four electrodes in a fluid and current flowing direction, to force a potential difference on an electrical circuit through the borehole, outside the measurement tube, to be zero, thereby forcing all the current to flow through the measurement tube. The downside of this method is that it requires a parallel control loop to maintain the voltage correctly on the bucking electrode(s).

In another attempted solution, the measurement current is split into two equal paths that are returned to an electrode placed at a midpoint of the measurement tube. Thus, two separate measurements are performed and any other current still flowing out into the borehole is ignored as it does not return through the measurement apparatus. This technique provides two simultaneous results, without resolving the issue of which one of the results is the more correct.

None of the above attempted solutions has correctly and definitively solved the problem of the current flowing outside the measurement tube. Accordingly, it would be desirable to provide systems and methods that overcome the afore-described problems and drawbacks.

SUMMARY

According to an exemplary embodiment, a fluid resistivity measurement apparatus includes a fluid column defining structure, two current injecting electrodes, voltage measurement electrodes, and two additional electrodes. The fluid column defining structure is configured to allow a fluid, whose resistivity is to be measured, to fill a fluid column inside the fluid column defining structure. The two current injecting electrodes are disposed inside the fluid column defining structure, at different positions in a longitudinal direction. The two current injecting electrodes are configured to inject a known current into the fluid column. The voltage measurement electrodes are disposed inside the fluid column defining structure, being located at different measurement positions in the longitudinal direction, between the positions of the two current injecting electrodes. The voltage measurement electrodes are configured to measure a voltage across at least one measurement column, which is a portion of the fluid column. The two additional electrodes are disposed inside the fluid column defining structure, being located outside of the positions of the two current injecting electrodes in the longitudinal direction. The two additional electrodes are electrically connected to each other to have the same electrical potential.

According to another exemplary embodiment, a method of manufacturing a fluid resistivity measurement apparatus includes mounting two additional electrodes inside a fluid column defining structure, along a longitudinal direction, the two additional electrodes being electrically connected to each other to have the same electrical potential. The method further includes mounting two current injecting electrodes inside the fluid column defining structure, along the longitudinal direction, between the additional electrodes, and mounting measurement electrodes inside the fluid column defining structure, along the longitudinal direction, between the two current injecting electrodes.

According to another exemplary embodiment, a method of measuring a fluid resistivity includes (i) injecting a known current into a fluid column at different current injecting positions in a longitudinal direction, (ii) measuring a voltage across at least one measured column included in the fluid column, between the current injecting positions, and (iii) calculating a fluid resistivity based on the measured voltage, the known current and known geometrical characteristics, wherein a current flowing through fluid in the measurement column is a part of the known current, and is determined based on a ratio between a central distance along the longitudinal direction between the current injecting positions, and a sum of distances along the longitudinal direction between each of two positions of additional electrodes located outside the central distance, and a respective closer one of the current injecting positions.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of fluid resistivity measuring tools. However, the embodiments to be discussed next are not limited to these systems, but may be applied to other systems that require the measurement of resistivity in open tubes.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
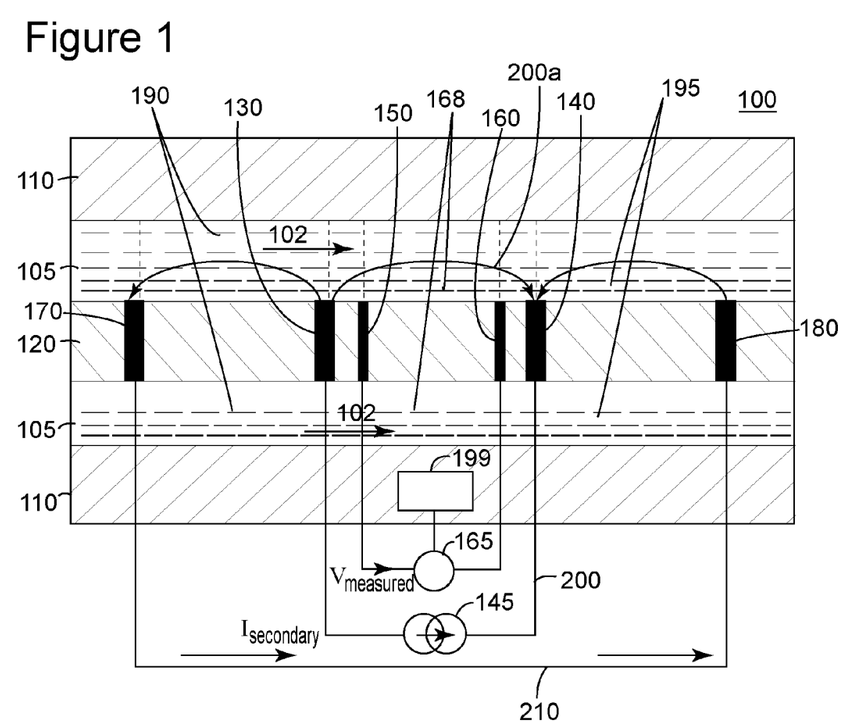
FIG. 1 is a schematic diagram of a resistivity measurement tool according to an exemplary embodiment.

A fluid resistance measurement tool 100 according to an exemplary embodiment is illustrated in FIG. 1. The measured fluid may be borehole mud. This tool 100 may be incorporated in a Wireline-Openhole tool string, used inside an uncased borehole after the drilling string has been removed. Such a tool string may have about 3½" diameter, and operates inside a 6-7" diameter open hole. The fluid resistance measurement tool 100 may have about 1" internal diameter.

Figure 2:
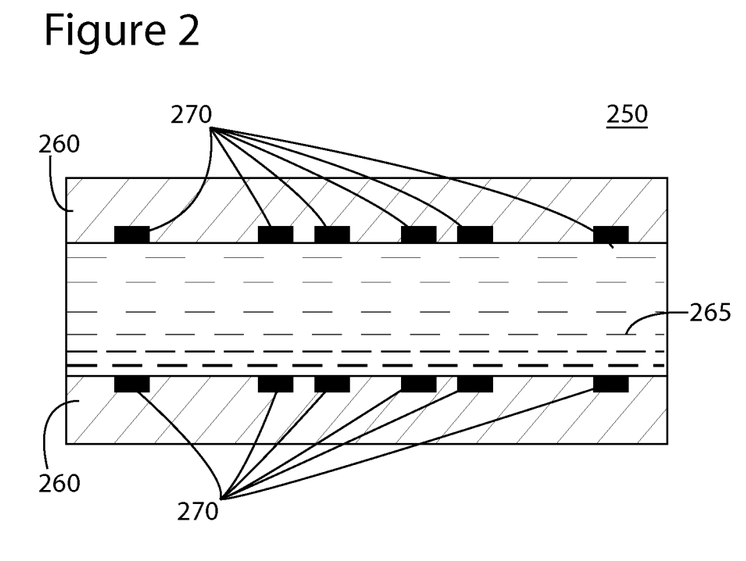
FIG. 2 is a schematic diagram of a resistivity measurement tool according to another exemplary embodiment.

Here, FIG. 1 is a cross-section along a longitudinal direction 102. The tool 100 includes a column defining structure immersed in a fluid whose resistivity is to be measured. The fluid may flow in the longitudinal direction 102, along a fluid column 105 (the fluid surrounding and flowing also outside the tool). However, the fluid may be stationary relative to the tool. The column defining structure of the tool 100 includes an outer tube 110 and a probe 120, which are both made of insulating materials. For example, the outer tube 110 and the probe 120 may be made of polyether ether ketone (PEEK). The probe 120 may be inserted inside the outer tube 110, so that the fluid column 105 is the fluid between the outer tube 110 and the probe 120. In an alternative embodiment 250 illustrated in FIG. 2, the column defining structure may be only a tube 260, and, in this case, the fluid column 265 is the fluid (flowing) inside the tube.

Multiple electrodes are mounted on the probe 120, at different positions in the longitudinal direction 102. In the alternative embodiment 250 illustrated in FIG. 2, where the column defining structure is the tube 260, the electrodes 270 are mounted on an inner surface of the tube 260 (i.e., no probe).

Two current injecting electrodes 130 and 140 are connected to a current source 145 configured to inject a low frequency alternating current in the fluid column. The injected current flows from one of the current injecting electrodes (e.g., 130) to the other of the current injecting electrodes (e.g., 140) via the fluid, the current injecting electrodes having different potentials. The fluid being a conductor, the injected current is split into a first current flowing directly (e.g., in the longitudinal direction 102, along a path 200a) from the current injecting electrode 130 to the current injecting electrode 140, and a second current flowing indirectly from the current injecting electrode 130 through the fluid, the second current flowing in a direction opposite to the first current, to reach the current injecting electrode 140. Here, a person of skill in the art would understand that this description asserts a fixed direction of the currents as in continuous current circuits. For the low frequency alternating current used in the measurement, the features (e.g., current being split) described above are similar to those in the continuous current, although a direction of the injected current is periodically changed.

Two measurement electrodes 150 and 160 are placed between the current injecting electrodes 130 and 140 in the longitudinal direction 102. The measurement electrodes 150 and 160 are configured to be connected to a voltage measurement apparatus 165, to monitor a voltage ($V_{measure}$) across a measured fluid column 168. The measured fluid column 168 is a portion of the fluid column 105, and is delimited by areas perpendicular to the longitudinal direction 102, at the positions of the measurement electrodes 150 and 160. A current flowing along the measured fluid column 168 is equal to the first current (therefore, the first current is less than the injected current). A ratio of (i) the measured voltage and (ii) the first current flowing along the measured fluid column 168 yields a fluid resistance value R of the fluid in the measured fluid column 168. The fluid resistance value R together with known geometrical characteristics of the measured fluid column 168 (e.g., an area and a length of the measured fluid column 168) can then be used to calculate the fluid resistivity.

Two additional electrodes 170 and 180, which are electrically connected with each other (i.e., shorted), and, thus, have the same potential, are placed outside the electrodes 130, 140, 150 and 160, in the longitudinal direction 102, away from the measurement column 168. The additional electrodes 170 and 180 may be connected via a wire 210, which may be located inside the probe 120. Due to the presence of the additional electrodes 170 and 180 having the same potential, the second current does not flow in the fluid outside the tool 100, but from the current injecting electrode 130 and the additional electrode 170 through a first portion 190 of the fluid column 105, from the additional electrode 170 to the additional electrode 180 through the wire 210, and then from the additional electrode 180 to the current injecting electrode 140 through a second portion 195 of the fluid column 105. Therefore, the second current flows via a known secondary loop, and not via an unpredictable and uncharacterized path through fluid outside the tool 100.

In other words, the current injected in the fluid from a first loop 200 via the current injecting electrodes 130 and 140 is divided in two currents flowing along two different paths. A first current ($I_{measure}$) flows between the current injecting electrodes 130 and 140 through the measurement column 168. A second current ($I_{secondary}$) flows from a current injecting electrode to the other current injecting electrode, via the first portion 190 of the fluid column 105, the wire 210 and the second portion 195 of the fluid column 105.

According to Kirchoff's conservation of charge law, the current injected in the fluid from the first loop 200 is the sum of the first current ($I_{measure}$), and the second current ($I_{secondary}$). In one embodiment, distances between the electrodes 170 and 130, 130 and 140, and 140 and 180 (which are listed in the order in which they are arranged along the probe 120 in the longitudinal direction 102) are substantially equal. However, distances between electrodes having different relationships may be used in other embodiments. When the distances between the electrodes 170 and 130, 130 and 140, and 140 and 180 are substantially equal, the second current travels a distance through fluid that is twice a distance that the first current travels through the fluid between the current injecting electrodes 130 and 140.

Assuming that a resistance other than the fluid resistance is negligible, the first current ($I_{measure}$), is ⅔ of the current injected in the fluid from the first loop 200. This first current ($I_{measure}$), which causes the measured potential difference ($V_{measure}$), is not affected by borehole conditions outside the measurement column.

The second current ($I_{secondary}$) is then ⅓ of the current injected in the fluid from the first loop 200, or half of the first current ($I_{measure}$).

Figure 3:
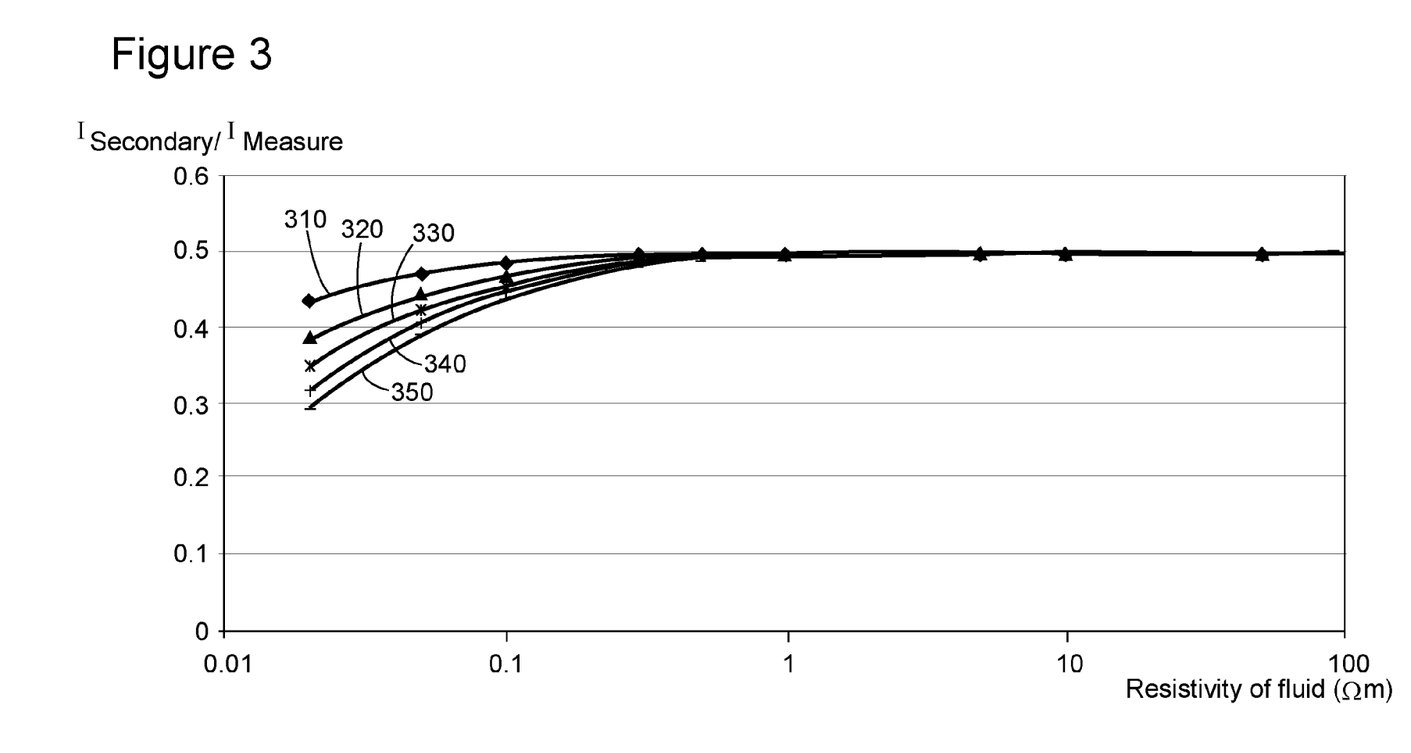
FIG. 3 is a graph of a ratio between a measured current and a secondary current measured in a resistivity measurement tool according to an exemplary embodiment, the ratio being represented as a function of fluid resistivity, for various contact resistance values.

These relationships between currents are valid depending on whether the assumption that the resistance other than the fluid resistance (e.g., of wires and connections) is negligible. This assumption has been tested for a length of the measurement column of 0.0508 m, an area of the measurement column of 0.001425158 m$^2$, and fluid resistivity values in the range of 0.01 to 100 Ωm. Test results for a contact resistance of each electrode between 0.1 and 0.5Ω are illustrated in FIG. 3. In FIG. 3, the y-axis represents a ratio of the second current ($I_{secondary}$) over the first current ($I_{measure}$), and the x-axis represents fluid resistivity values in a logarithmic scale. Since the embodiment used during the test had substantially equal distances between electrodes 170 and 130, 130 and 140, and 140 and 180, the value of the ratio of the second current ($I_{secondary}$) over the first current ($I_{measure}$) is expected to be 0.5 if the assumption is valid.

In the graph of FIG. 3, line 310 corresponds to a contact resistance of each electrode of 0.1Ω, line 320 corresponds to a contact resistance of each electrode of 0.2Ω, line 330 corresponds to a contact resistance of each electrode of 0.3Ω, line 340 corresponds to a contact resistance of each electrode of 0.4Ω, and line 350 corresponds to a contact resistance of each electrode of 0.5Ω. An expected range of values for a borehole mud resistivity is between 0.2 and 1000 Ωm. The assumption that the resistance other than fluid resistance is negligible appears to be appropriate for most of the expected range of values. In fact, the contact resistance of the current injecting electrode and or the measurement electrodes has relatively little impact because for the first the known current is injected regardless of the contact resistance, and, for the measurement electrodes, a very small current is supposed to go therethrough. For smaller resistivity values, a tool with a longer measurement column may be used to diminish an error due to the resistance other than the fluid resistance by increasing a value of the resistance due to the fluid. Since the contact resistances of additional electrodes are a main source of error in the fluid resistivity measurement, these connections are made of materials and in a manner aimed to achieve smallest resistances. The contact resistance of each of the additional electrodes may be affected by the electrodes sizes and corrosion. Thus, the effect of the contact resistance may be alleviated by using "fat" (i.e., big area leading to a small resistance) contacts for the additional electrodes, for example, by extending towards the end of the tube.

The fluid resistivity may be calculated by a fluid resistivity calculating unit 199 configured to receive the measured voltage, and to calculate a resistivity of the fluid passing through the fluid column defining structure, using the known current injected in the fluid column 105 via the current injecting electrodes 130 and 140, and known geometrical characteristics. The fluid resistivity calculating unit 199 may be located near a measurement site in the borehole or at the surface. A measured voltage may be transmitted to the fluid resistivity calculating unit 199 via wire or wirelessly.

The fluid resistivity calculating unit 199 may use knowledge of the dependence of the ratio of the second current ($I_{secondary}$) over the first current ($I_{measure}$) on the measured resistivity, as illustrated in FIG. 3, to iteratively obtain correct measurements when the fluid has low resistivity values. For, example, if an initially calculated resistivity is below a predetermined resistivity value (e.g., 0.8 Ωm for FIG. 3) at which the connecting resistances impact the ratio of currents, the fluid resistivity calculating unit 199 may use a corrected value of the ratio of currents based on the known dependence to calculate a new resistivity value and repeat this process until convergence is achieved.

The known geometrical characteristics may include an area of the fluid column 105 perpendicular to the longitudinal direction 102, a distance along the longitudinal direction between the measuring electrodes, and a ratio between (i) a distance between the two current injecting electrodes 130 and 140, and (ii) a sum of distances between each one of the additional electrodes (i.e., 170 or 180) and a respective closer one of the two current injecting electrodes (i.e., 130 and 140).

The fluid resistivity calculating unit may estimate a portion of the known current flowing between the two measurement electrodes 150 and 160 based on a ratio between (i) a distance between the two current injecting electrodes 130 and 140, and (ii) a sum of distances between each one of the additional electrodes (i.e., 170 and 180) and a respective closer one of the two current injecting electrodes (i.e., 130 and 140).

The two current injecting electrodes 130 and 140 and the two additional electrodes 170 and 180 may be arranged along the longitudinal direction such that a first current ($I_{measure}$) flowing through fluid directly between the two current injecting electrodes 130 and 140 to be twice a second current ($I_{secondary}$) flowing through the fluid from one of the current injecting electrodes 130 or 140 to a closer one of the two additional electrodes 170 or 180 and from of the other the two additional electrodes 170 or 180 to the other of the two current injecting electrodes 130 or 140. For example, this relationship between the currents occurs when a resistance in of the fluid through which the second current ($I_{secondary}$) flows, is twice a resistance of the fluid through which the first current ($I_{measure}$) flows, between the two current injecting electrodes 130 and 140 in the longitudinal direction 102.

A manner of dividing the known injected current between the first first current and the second current is known and predictable, therefore alleviating the problem of the conventional measurement in which the resistance R of a measured fluid column is obtained using an inaccurate value of the current. Unlike when at least one 'bucking' electrode is placed in addition to and outside an area of the four electrodes, a parallel control loop to maintain the voltage correctly on the additional electrodes is not required. Additionally unlike when the measurement current is split into two equal paths that are returned to an electrode placed at a midpoint of the measurement tube, the apparatus 100 performs a single measurement.

The outer tube 110 and the probe 120 inserted inside the outer tube 110 may be considered as a fluid column defining structure. The probe 120 may be configured to be inserted substantially in the middle of the outer tube 110 along the longitudinal direction. However, in some embodiments, the probe 120 may configured to be inserted in other position than in the middle of the outer tube 110.

Figure 4:
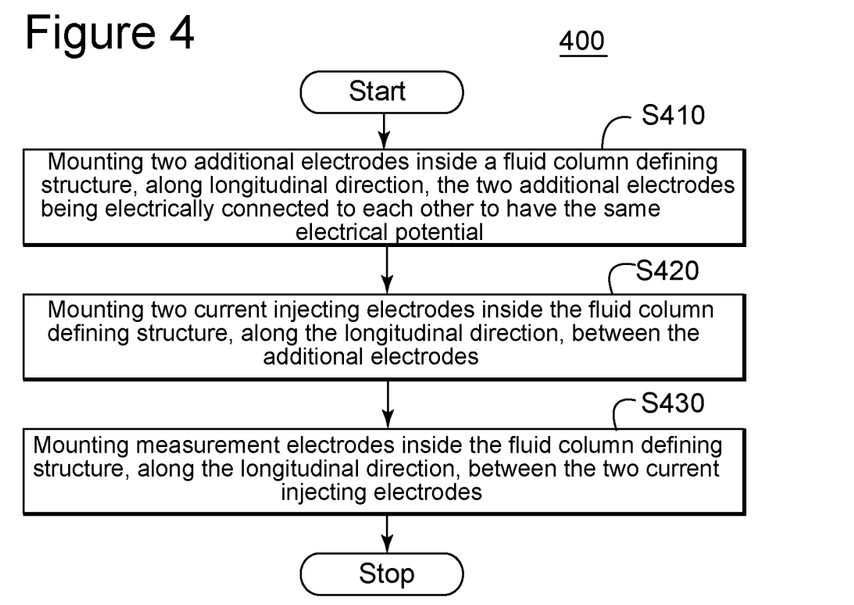
FIG. 4 is a flow chart of a method of manufacturing a fluid resistivity measurement apparatus according to another exemplary embodiment.

A flow diagram of a method 400 of manufacturing a fluid resistivity measurement apparatus according to an exemplary embodiment is illustrated in FIG. 4. At S410, the method 400 includes mounting two additional electrodes inside a fluid column defining structure, along a longitudinal direction. The two additional electrodes are electrically connected to each other to have the same electrical potential. In one embodiment, the fluid column defining structure may include an outer tube and a probe, the two current injecting electrodes, the voltage measurement electrodes, and the two additional electrodes being mounted on the probe, which may be located substantially in a middle of the outer tube. In another embodiment, the fluid column defining structure may be a tube, and the two current injecting electrodes, the voltage measurement electrodes, and the two additional electrodes may be mounted on an inner surface of the tube.

At S420, the method 400 includes mounting two current injecting electrodes inside the fluid column defining structure, along a longitudinal direction, between the additional electrodes. In one embodiment, the mounting of the two current injecting electrodes on the probe may be performed such that a distance between the two current injecting electrodes along the longitudinal direction is half of a sum of distances between each of the additional electrodes and a respective closer one of the two current injecting electrodes. In another embodiment, mounting two current injecting electrodes on the probe are performed such that a distance between the two current injecting electrodes along the longitudinal direction is substantially equal to distances between each of the additional electrodes and a respective closer one of the two current injecting electrodes.

The method 400 further includes mounting measurement electrodes inside the fluid column defining structure, along a longitudinal direction, between the two current injecting electrodes, at S430.

The method 400 may also connecting the two current injecting electrodes to a current source configured to provide a known current to be injected into the fluid passing through the outer tube.

The method 400 may also include connecting the measurement electrodes to a fluid resistivity calculating unit configured to receive a measured voltage, and to calculate a resistivity of the fluid passing through the outer tube, using a known injected current and known geometrical characteristics. The method 400 may further include storing in the fluid resistivity calculating unit values of the known geometrical characteristics including an area perpendicular to the longitudinal direction, inside the outer tube and outside the probe, a distance along the longitudinal direction between the measuring electrodes, and a ratio between (i) a distance between the two current injecting electrodes, (ii) a sum of distances between each one of the additional electrodes and a respective closer one of the two current injecting electrodes.

Figure 5:
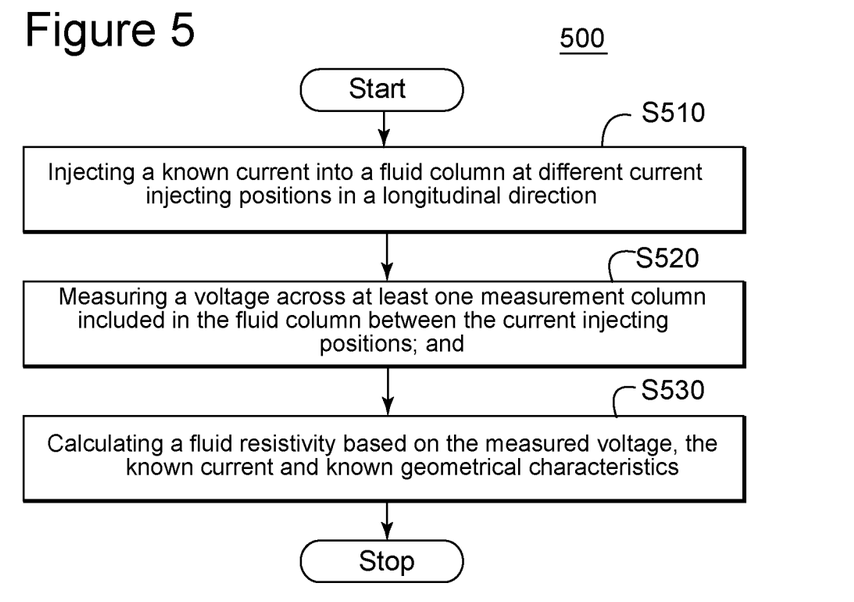
FIG. 5 is a flow chart illustrating steps performed by a method of measuring a fluid resistivity according to another exemplary embodiment.

A method 500 of measuring a fluid resistivity according to an exemplary embodiment is illustrated in FIG. 5. At S510, the method 500 includes injecting a known current into the fluid flowing through the fluid column at different current injecting positions in a longitudinal direction.

At S520, the method 500 includes measuring a voltage across at least one measurement column included in the fluid column in the longitudinal direction, and, at S530, the method 500 includes calculating a fluid resistivity based on the measured voltage, the known current and known geometrical characteristics. A current flowing through fluid in the measurement column is a part of the known current, and is determined based on a ratio between a central distance along the longitudinal direction between the current injecting positions, and a sum of distances along the longitudinal direction between each of two positions of additional electrodes located outside the central distance, and a closer one of the current injecting positions.

The method 500 may be performed when the central distance is substantially equal to each of the distances along the longitudinal direction between each of the two positions of the additional electrodes and the closer one of the current injecting positions. The method 500 may also be performed when the known geometrical characteristics include an area perpendicular to the longitudinal direction, inside the fluid column defining structure, and a distance along the longitudinal direction between the measuring electrodes.

The method 500 may further include calculating iteratively a corrected resistivity value, when the resistivity is lower than a predetermined resistivity value, in each iteration using a corrected value of the ratio based on a known dependence of the ratio of the resistivity.

The disclosed exemplary embodiments provide an apparatus, methods of manufacturing and methods of measuring a fluid resistivity. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A fluid resistivity measurement apparatus, comprising:
a fluid column defining structure configured to allow a fluid, whose resistivity is to be measured, to fill a fluid column inside the fluid column defining structure;
two current injecting electrodes disposed inside the fluid column defining structure, at different positions in a longitudinal direction, the two current injecting electrodes being configured to inject a known current into the fluid column;
voltage measurement electrodes disposed inside the fluid column defining structure, at different measurement positions in the longitudinal direction, between the positions of the two current injecting electrodes, the voltage measurement electrodes being configured to measure a voltage across at least one measurement column, which is a portion of the fluid column;

two additional electrodes disposed inside the fluid column defining structure, outside of the positions of the two current injecting electrodes in the longitudinal direction, the two additional electrodes being electrically connected to each other to have the same electrical potential;

a fluid resistivity calculating unit configured to receive the measured voltage, and to calculate a resistivity of the fluid passing through the fluid column defining structure, using the known current and known geometrical characteristics; and wherein the fluid resistivity calculating unit is configured to estimate a portion of the known current flowing between the measurement electrodes based on a ratio between (i) a distance between the two current injecting electrodes, and (ii) a sum of distances between each one of the additional electrodes and a respective closer one of the two current injecting electrodes, and the fluid resistivity calculating unit is configured to iteratively obtain a corrected resistivity value, when the resistivity is lower than a predetermined resistivity value, in each iteration using a corrected value of the ratio based on a known dependence of the ratio of resistivity.

2. The fluid resistivity measurement apparatus of claim 1, wherein the known geometrical characteristics include an area perpendicular to the longitudinal direction, where the fluid flows inside the fluid column defining structure, a distance along the longitudinal direction between the measuring electrodes, and a ratio between (i) a distance between the two current injecting electrodes, and (ii) a sum of distances between each one of the additional electrodes and a respective closer one of the two current injecting electrodes.

3. The fluid resistivity measurement apparatus of claim 1, wherein the two current injecting electrodes and the two additional electrodes are arranged along the longitudinal direction such that a current flowing through a fluid in the fluid column, between the two current injecting electrodes to be about twice a current flowing through a fluid in the fluid column, between any one of the two additional electrodes and a closer one of the two current injecting electrodes.

4. The resistivity measurement apparatus of claim 1, wherein a distance along the longitudinal direction between the two current injecting electrodes is substantially equal to distances along the longitudinal direction between each one of the additional electrodes and a respective closer one of the two current injecting electrodes.

5. The resistivity measurement apparatus of claim 1, wherein the fluid column defining structure comprises:
an outer tube; and
a probe inserted inside the outer tube,
wherein the outer tube and the probe are made of electrically insulating materials and the two current injecting electrodes, the voltage measurement electrodes, and the two additional electrodes are located along the probe, in the longitudinal direction.

6. The resistivity measurement apparatus of claim 5, wherein the probe is configured to be inserted substantially in the middle of the outer tube, along the longitudinal direction.

7. The resistivity measurement apparatus of claim 1, wherein the fluid column defining structure comprises:
a tube made of an electrically insulating material,
wherein the two current injecting electrodes, the voltage measurement electrodes, and the two additional electrodes are located on an inner surface of the tube, in the longitudinal direction.

8. The resistivity measurement apparatus of claim 1, wherein resistances of the two additional electrodes are negligible compared to a resistance of a column of fluid flowing between the two current injecting electrodes, and a resistance of columns of fluid flowing between one of the two additional electrodes and a closer one of the two current injecting electrodes.

9. A method of manufacturing a fluid resistivity measurement apparatus, the method comprising:
mounting two same potential electrodes inside a fluid column defining structure, along a longitudinal direction, the two additional electrodes being electrically connected to each other to have the same electrical potential;
mounting two current injecting electrodes inside the fluid column defining structure, along the longitudinal direction, between the same potential electrodes;
mounting measurement electrodes inside the fluid column defining structure, along the longitudinal direction, between the two current injecting electrodes; connecting at least a pair of the measurement electrodes to a fluid resistivity calculating unit configured to receive a measured voltage, and to calculate a resistivity of the fluid, using a known injected current and known geometrical characteristics of the fluid column defining structure; and storing values of the known geometrical characteristics in the fluid resistivity calculating unit, the values including (a) an area perpendicular to the longitudinal direction, inside the fluid column defining structure, (b) a distance along the longitudinal direction, between the measuring electrodes, and (c) a ratio between (i) a distance between the two current injecting electrodes, and (ii) a sum of distances in the longitudinal direction, between each one of the same potential electrodes and a respective closer one of the two current injecting electrodes.

10. The method of claim 9, further comprising:
connecting the two current injecting electrodes to a current source configured to provide a known current to be injected into the fluid passing through the fluid column defining structure.

11. The method of claim 9, wherein the mounting of the two current injecting electrodes is performed such that a distance in the longitudinal direction, between the two current injecting electrodes is half of a sum of distances in the longitudinal direction, between each of the same potential electrodes and a respective closer one of the two current injecting electrodes.

12. The method of claim 9, wherein the mounting of the two current injecting electrodes is performed such that a distance in the longitudinal direction, between the two current injecting electrodes is substantially equal to distances in the longitudinal direction, between each of the same potential electrodes and a respective closer one of the two current injecting electrodes.

13. The method of claim 9, wherein the fluid column defining structure includes an outer tube and a probe, the two current injecting electrodes, the voltage measurement electrodes, and the two same potential electrodes being mounted on the probe which is located substantially in a middle of the outer tube.

14. A method of measuring a fluid resistivity, comprising:
injecting a known current into a fluid column at different current injecting positions in a longitudinal direction;
measuring a voltage across at least one measured fluid column included in the fluid column, between the current injecting positions; and calculating a fluid resistivity based on the measured voltage, the known current and known geometrical characteristics of the at least one measured fluid column, wherein a current flowing in the at least one measured fluid column is determined based on a ratio between (i) a central distance along the longitudinal direction, between the current injecting positions, and (ii) a sum of distances between each of two additional electrodes located outside the central distance, and a respective closer one of the current injecting positions.

15. The method of claim 14, wherein the central distance is substantially equal to each of the distances along the longitudinal direction, between each of the positions of the additional electrodes and a respective closer one of the current injecting positions.

16. The method of claim 14, wherein the known geometrical characteristics include an area of the fluid column, perpendicular to the longitudinal direction, and a distance in the longitudinal direction, between the measuring electrodes.

\* \* \* \* \*